US012578721B2

(12) United States Patent
Tsuruta et al.

(10) Patent No.: US 12,578,721 B2
(45) Date of Patent: Mar. 17, 2026

(54) SYSTEMS AND METHODS FOR REMOTE CONTROL OF VEHICLES

(71) Applicant: Toyota Motor North America, Inc., Plano, TX (US)

(72) Inventors: Yosuke Tsuruta, Frisco, TX (US); Imad Zahid, Carrollton, TX (US)

(73) Assignees: TOYOTA MOTOR NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 18/184,388

(22) Filed: Mar. 15, 2023

(65) Prior Publication Data

US 2024/0310832 A1 Sep. 19, 2024

(51) Int. Cl.
G05D 1/00 (2006.01)
G07C 5/00 (2006.01)
G08C 17/02 (2006.01)

(52) U.S. Cl.
CPC ......... G05D 1/0022 (2013.01); G05D 1/0016 (2013.01); G05D 1/0038 (2013.01); G07C 5/008 (2013.01); G08C 17/02 (2013.01)

(58) Field of Classification Search
CPC .. G05D 1/0022; G05D 1/0016; G05D 1/0038; G07C 5/008; G08C 17/02
USPC .......................................................... 701/2
See application file for complete search history.

(56) References Cited

U.S. PATENT DOCUMENTS

| | | | | |
|---|---|---|---|---|
| 12,192,752 B2 * | 1/2025 | Horita | ................. | H04W 36/324 |
| 2020/0192351 A1 * | 6/2020 | Rastoll | ................. | G05D 1/0038 |
| 2020/0209874 A1 | 7/2020 | Chen et al. | | |
| 2021/0016801 A1 * | 1/2021 | Nakagawa | ............. | G08G 1/164 |
| 2021/0134154 A1 * | 5/2021 | Wang | ................... | G05D 1/0297 |

FOREIGN PATENT DOCUMENTS

| | | |
|---|---|---|
| CN | 110866485 A | 3/2020 |
| CN | 111223354 A | 6/2020 |
| CN | 110021210 B | 3/2021 |
| CN | 112906126 A | 6/2021 |
| CN | 114935940 A | 8/2022 |

(Continued)

*Primary Examiner* — Muhammad Shafi
(74) *Attorney, Agent, or Firm* — DINSMORE & SHOHL LLP

(57) ABSTRACT

In one embodiment, a system includes a driver station having a control interface, an electronic display, and a driver data communication module, and a vehicle data communication module. The vehicle data communication module receives vehicle sensor data generated by a plurality of vehicle sensors of a vehicle, and environment sensor data generated by a plurality of environment sensors within an environment of the vehicle. The driver data communication module and the vehicle data communication module are in bidirectional communication such that the vehicle data communication module wirelessly provides the vehicle sensor data and the environment sensor data to the driver data communication module, the driver data communication module renders a view of the vehicle and the environment on the electronic display, the control interface wirelessly provides control instructions to the vehicle data communication module, and the vehicle data communication module provides the control instructions to the vehicle.

20 Claims, 5 Drawing Sheets

(56)     References Cited

FOREIGN PATENT DOCUMENTS

| DE | 102018-105598 | * | 9/2018 |
| WO | WO-2012-024722 | * | 3/2012 |
| WO | WO-2022-124497 | * | 6/2022 |

* cited by examiner

SYSTEMS AND METHODS FOR REMOTE CONTROL OF VEHICLES

TECHNICAL FIELD

The present specification relates to remote control of vehicles.

BACKGROUND

A person may desire to drive a particular vehicle, such as a racecar, but may have fears of traveling at such a high speed, or it may be difficult for the person to get to a racetrack due to travel distances. In many cases, only very skilled drivers or those who live near a racetrack ever have the opportunity to drive a car, such as a racecar, at high speeds on a racetrack.

Accordingly, alternative systems and methods for operating vehicles may be desired.

SUMMARY

In one embodiment, a system includes a driver station having a control interface, an electronic display, and a driver data communication module, and a vehicle data communication module. The driver station is remote from the vehicle data communication module. The vehicle data communication module receives vehicle sensor data generated by a plurality of vehicle sensors of a vehicle, and environment sensor data generated by a plurality of environment sensors within an environment of the vehicle. The driver data communication module and the vehicle data communication module are in bidirectional communication such that the vehicle data communication module wirelessly provides the vehicle sensor data and the environment sensor data to the driver data communication module, the driver data communication module renders a view of the vehicle and the environment on the electronic display, the control interface wirelessly provides control instructions to the vehicle data communication module, and the vehicle data communication module provides the control instructions to the vehicle such that a user of the control interface remotely operates the vehicle.

In another embodiment, a system includes a driver station comprising a control interface, an electronic display, and a driver data communication module, and a racing vehicle comprising a plurality of vehicle sensors and a vehicle data communication module provided at a racetrack. The driver station is remote from the vehicle data communication module. The vehicle data communication module receives vehicle sensor data generated by the plurality of vehicle sensors, and environment sensor data generated by a plurality of environment sensors at the racetrack. The driver data communication module and the vehicle data communication module are in bidirectional communication such that the vehicle data communication module wirelessly provides the vehicle sensor data and the environment sensor data to the driver data communication module, the driver data communication module renders a view of racing the vehicle and the environment on the electronic display, the control interface wirelessly provides control instructions to the vehicle data communication module, and the vehicle data communication module provides the control instructions to the racing vehicle such that a user of the control interface remotely operates the racing vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to systems and methods that enable users to remotely drive an actual vehicle without being physically located within the vehicle. Non-limiting examples include racing vehicles (e.g., racecars, race trucks) and off-road vehicles. These types of vehicles are very difficult to control from a remote location for different reasons. With respect to racing vehicles, they travel at high speeds such that data latency severely affects the ability for a remote driver to operate the vehicle. For example, what is displayed on a driver's electronic display may be delayed by a period of time as compared with the performance of the actual vehicle. Latency may make remote vehicle control impossible for high-speed vehicles such as racecars. With respect to off-road vehicles, such vehicles often are driven in remote areas where cellular communication networks do not exist or are very slow. These cellular networks make it all but impossible to control off-road vehicles in remote environments.

As used herein, the term "racecar" means a vehicle that travels greater than 150 kph in a racing environment. As used herein, the term "racing environment" means a location for which its primary purpose is for racing vehicles, such as a racetrack. As used herein, an "off-road vehicle" is a four-wheel drive vehicle.

As used herein, the term "remote environment" means a location that does not have a cellular communication network. Various embodiments of systems and methods for remotely operating vehicles are described in detail below.

Figure 1:
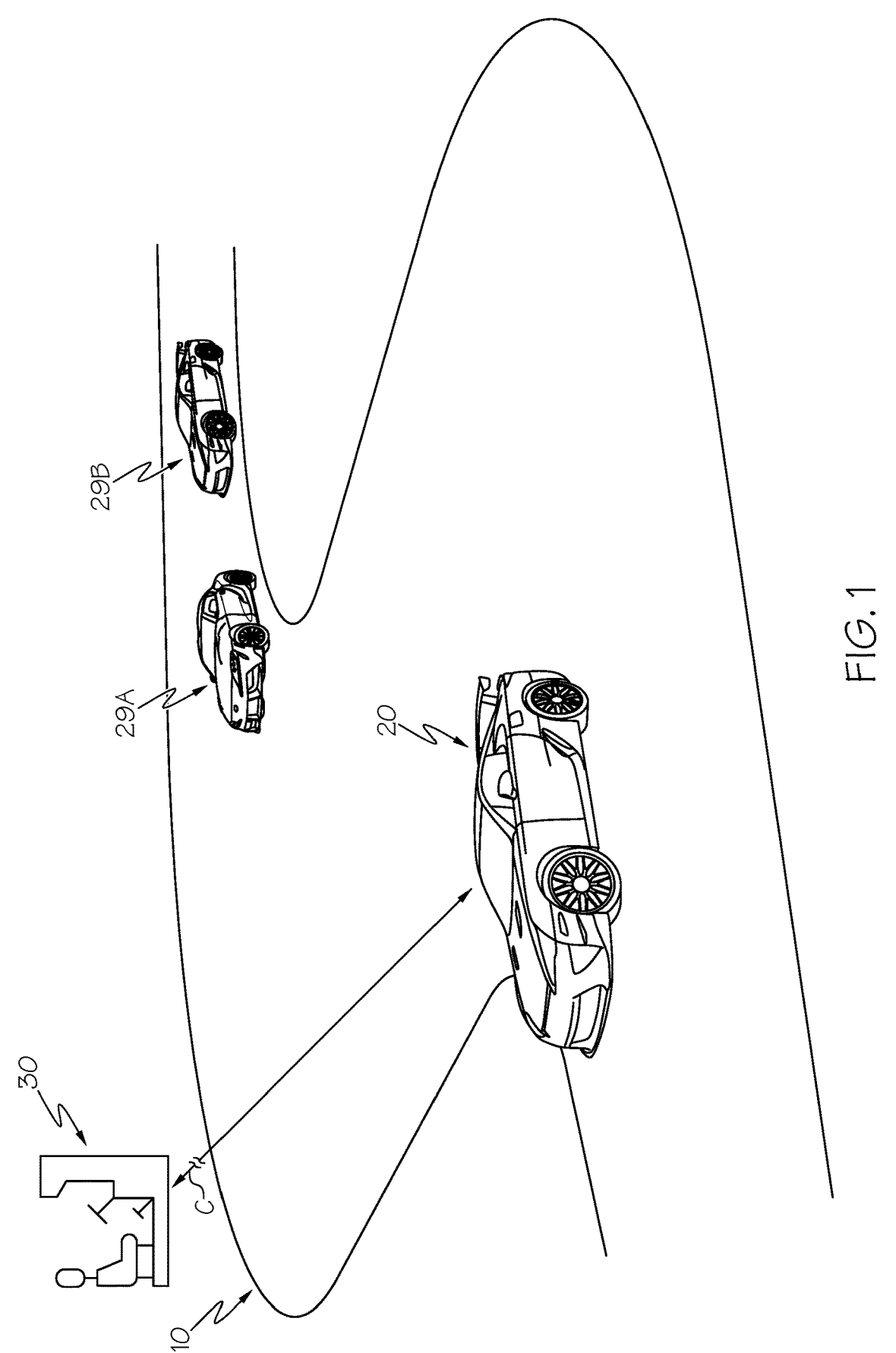
FIG. 1 schematically illustrates a driver station remotely controlling a physical vehicle on a racetrack according to one or more embodiments described and illustrated herein.

Referring now to FIG. 1, a remotely controlled vehicle 20 in a racing environment that is being controlled by a user at a driver station 30 is schematically illustrated. The vehicle 20 is a physical racecar that is traversing a physical racetrack of the racing environment 10. Other vehicles 29A, 29B are also traversing the racetrack of the racing environment 10. These other vehicles 29A, 29B may be driven by drivers within the other vehicles 29A, 29B, or they may also be remotely driven, for example.

The driver station 30 is remote from the vehicle 20. For example, the driver station 30 may be at a location on the property of the racetrack, at a location adjacent to the property of the racetrack, or in another region of the world entirely. The driver station 30 wirelessly communicates with the vehicle 20 by way of a communication network, as shown by arrow C. As a non-limiting example, the wireless communication network may be a 5G mmWave network or a known or yet-to-be-developed wireless communication network having data speeds equal to or greater than a 5G mmWave network. High-speed wireless communication networks enable remote driving of vehicles traveling upwards of 320 kph.

As described in more detail below, sensor data from the vehicle 20 and the environment (e.g., the racing environment 10) is sent to the driver station 30 by the communication channel C, which displays a virtual environment that corresponds with the environment in which the vehicle 20 is traversing. Thus, the driver station 30 renders a display that mimics what the driver would be seeing if she were physically sitting within the vehicle 20. Additionally, control instructions derived from the user manipulating controls of the driver station 30 (e.g., pressing the accelerator, braking, turning the steering wheel, and the like) are provided to the vehicle 20 over the communication channel C by way of a high-speed wireless communications network. In this manner, a user may remotely race an actual vehicle 20 on an actual racetrack without being physically present within the vehicle 20.

Figure 2:
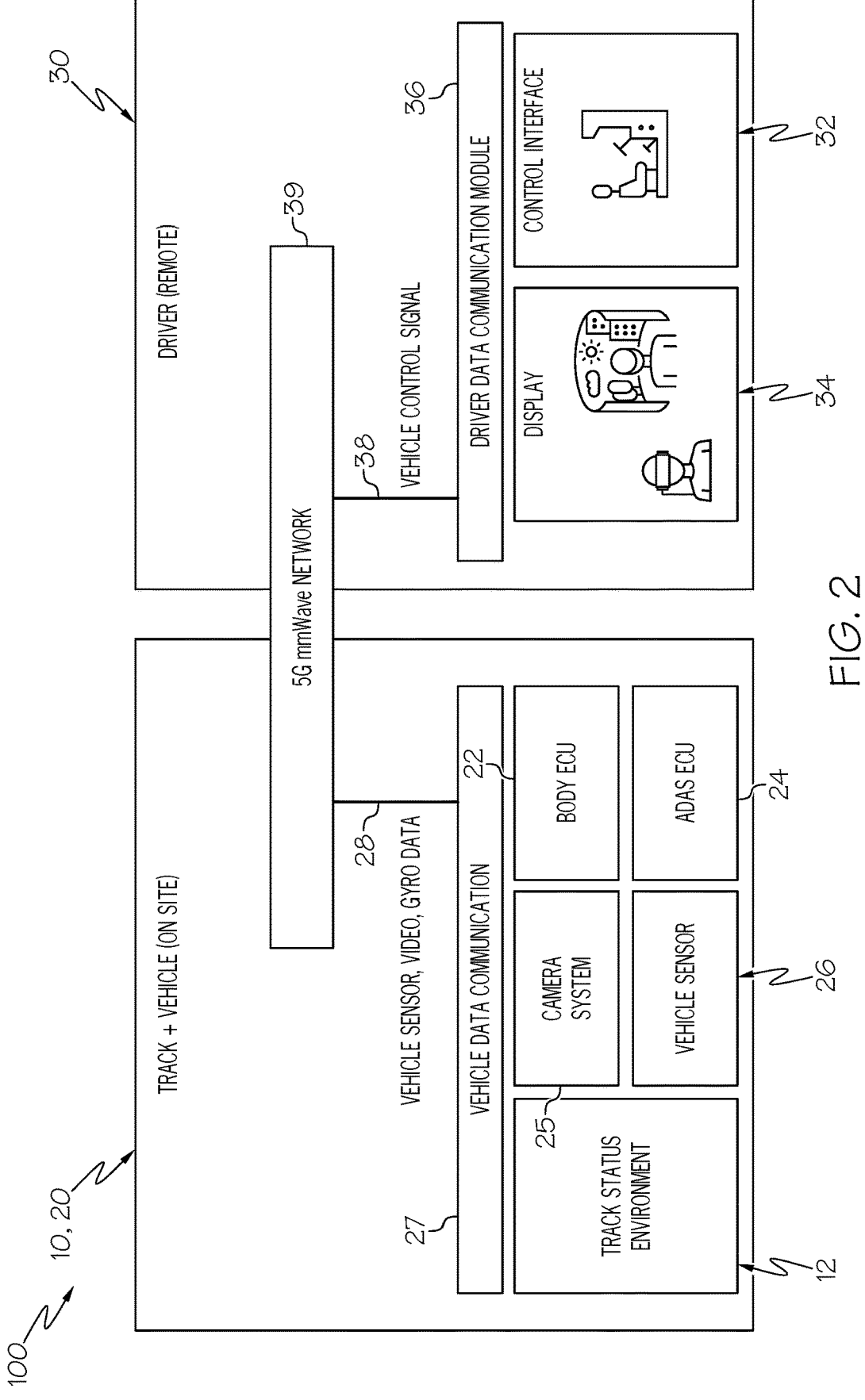
FIG. 2 illustrates an example system for remotely controlling a vehicle according to one or more embodiments described and illustrated herein.

Referring now to FIG. 2, an example system 100 for providing remote control of a physical vehicle, such as remote control of a racing vehicle on a racetrack, is schematically illustrated. The example system 100 includes a driver station 30, a vehicle 20 (e.g., a racecar) and an environment 10 (e.g., a racetrack). The environment 10 includes one or more environment sensors 12 that provide environment sensor data corresponding to environmental attributes of the environment. Nonlimiting examples of environment sensors 12 include a temperature sensor, a barometer, a wind sensor, a humidity sensor, and an ambient light sensor. Any other sensors may also be used. The environment sensor data can be used by the driver data communication module 36 to generate an accurate representation of the environment on the electronic display 34. For example, if the environment sensors 12 provide environment sensor data indicative of a sunny and calm day at the racetrack, the representation of the environment 10 on the electronic display 34 will be a sunny and calm day.

The environment sensors 12 may also be used by the driver data communication module 36 to reduce latency by predicting the trajectory that the vehicle will take based on the environment sensor data. For example, if the environment sensor data shows precipitation, the driver data communication module 36 may use the vehicle sensor data (described below) to predict how a vehicle will move on wet pavement so that the rendered image anticipates the movement of the physical vehicle 20 to account for any data latency.

The physical vehicle 20 also includes vehicle sensors 26, which may also include vehicle cameras that make of a camera system 25. Non-limiting examples of vehicle sensors include a speedometer, a inertia measurement unit, an accelerator sensor, a braking sensor, a camera, a radar sensor, a lidar sensor, a tire pressure sensor, and a steering sensor. It should be understood that other sensors may be utilized. The vehicle sensors 26 produce vehicle sensor data that is provided to one or more electronic control units (ECU) present on the vehicle, such as one or more advanced driver assistance ECUs 22 and one or more vehicle body ECUs 24. The ECUs are communicatively coupled to the vehicle data communication module 27 such that the vehicle data communication module 27 receives the vehicle sensor data so it may wirelessly send it to the driver data communication module 36.

The vehicle data communication module 27 sends the environment sensor data and the vehicle sensor data to the driver data communication module 36 over a wireless communication network 39, such as, without limitation, a 5G mmWave wireless communication network.

The vehicle data communication module 27 includes hardware for performing the functionalities described herein, such as, without limiting, wireless transceiver modules for communicating over the wireless communication network 39, one or more processors for executing computer-readable instructions performing the functionality described herein (e.g., receiving vehicle sensor data and environment sensor data, transmitting vehicle sensor data and environment sensor data to the driver data communication module 36, receiving control instructions from the driver data communication module 36, and providing control signals to one or more ECUs of the vehicle 20), and one or more memory device storing the computer readable instructions.

The driver data communication module 36 uses the vehicle sensor data and the environment sensor data to produce a rendering of the environment 10 for display on an electronic display 34 of the driver station 30. The electronic display 34 may be one or computer monitors, television screen, laptop computers, tablets, virtual reality headset, augmented reality glasses and/or the like. In some embodiments, the rendering of the environment 10 is totally virtual, meaning computer graphics are used to fully represent the environment 10. In other embodiments, video data from the camera system 25 of the vehicle 20 is displayed on the electronic display 34. In still other embodiments, the representation of the environment 10 includes both actual video data from the camera system of the vehicle 20 as well as computer-generated graphics.

Figure 3:
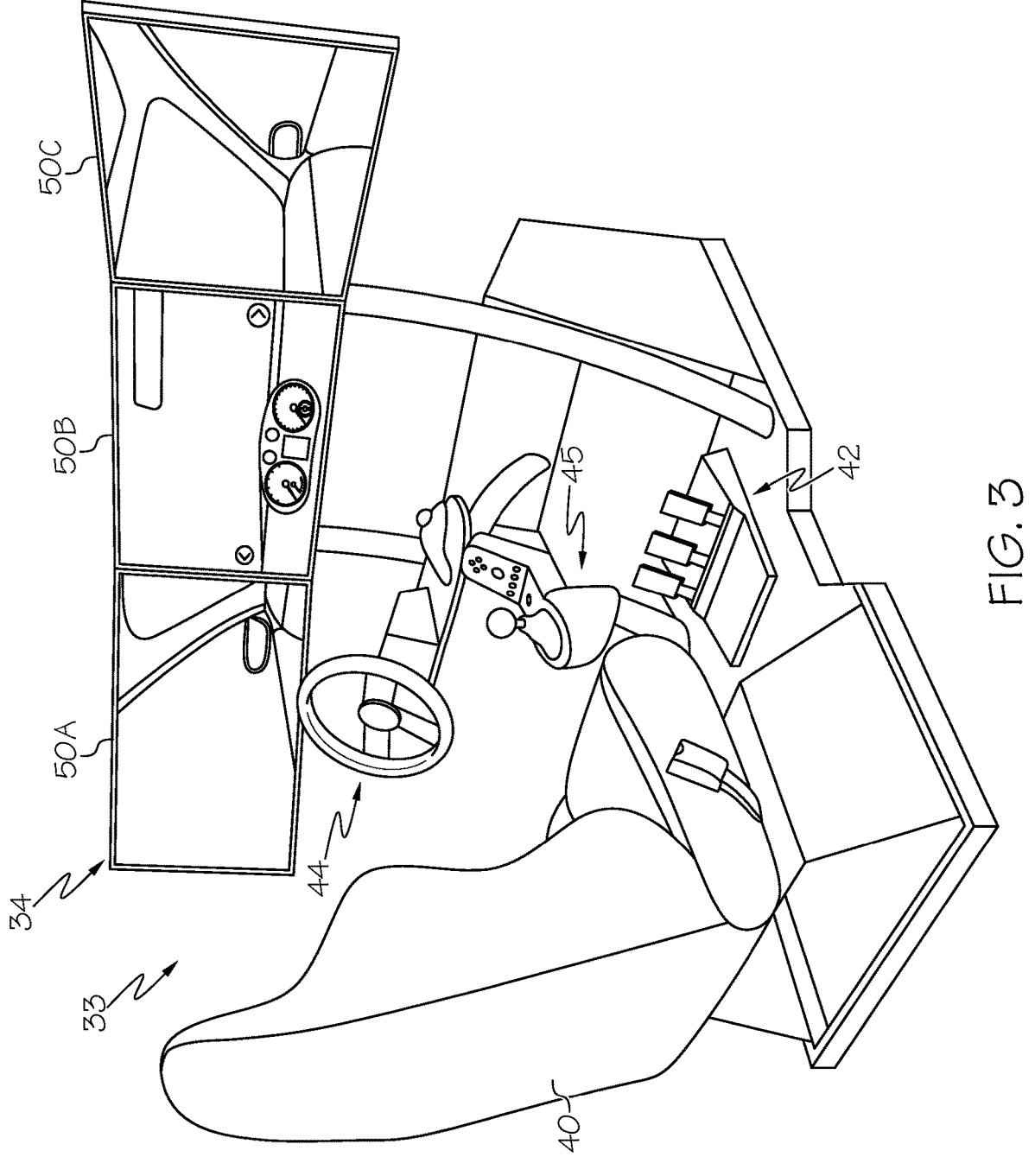
FIG. 3 illustrates an example driver station configured as a driving simulator according to one or more embodiments described and illustrated herein.

The control interface 32 include control devices used to control a physical vehicle. For example, the control interface 32 may be a driving simulator device 33, a non-limiting example of which is shown in FIG. 3. The driving simulator device 33 includes a seat 40 for the driver to sit in, pedals 42 including an accelerator pedal, a brake pedal and/or a clutch pedal, a steering wheel 44, a shifting device 45, and other controls, such as turn signal devices, infotainment controls, buttons, switches, and/or the like. As a non-limiting example, the seat 40 may be configured as a motion seat having one or more actuators for moving the seat according to the orientation of the vehicle 20. For example, roll and pitch information may be provided to the control interface 32 from one or more inertial measurement units of the vehicle sensors 26. The driver data communication module 36 provides control instructions to the one or more actuators of the seat 40 such that the seat is orientated in a manner that matches the seat of the physical vehicle 20. The seat 40 may also vibrate according to vibration sensor data provide by the vehicle 20 to mimic the user sitting in the vehicle 20 rather than the control interface 32. The driving simulator device 33 of FIG. 3 further includes the electronic display, which include three computer monitors 50A, 50B, and 50C.

As user may sit in the driving simulator device 33 and use the various controls to control the actual vehicle 20 in the environment 10. A representation of the vehicle 20 and the environment 10 is provided on the electronic display 34. The various control devices (e.g., the pedals 42, the steering wheel 44) include sensors that produce control signals. These control signals are provided to the driver data communication module 36, which provides these control signals to the vehicle data communication module 27 as control instructions. For example, when the driver presses the accelerator pedal, a corresponding acceleration control signal is produced. The driver data communication module 36 transmits this acceleration control signal as an acceleration instruction to the vehicle data communication module 27. The vehicle data communication module 27 produces an acceleration control signal that is provided to one or more ECUs of the vehicle 20, which results in acceleration of the vehicle 20.

The driver data communication module 36 includes hardware for performing the functionalities described herein, such as, without limiting, wireless transceiver modules for communicating over the wireless communication network 39, one or more processors for executing computer-readable instructions to perform the functionality described herein (e.g., receiving vehicle sensor data and environment sensor data, producing environment rendering for display on the electronic display 34, receiving control signals from the control interface 32, and transmitting control instructions to the vehicle data communication module 27), and one or more memory device storing the computer readable instructions.

The control interface 32 is not limited to a driving simulator device 33 as shown in FIG. 33. The control interface 32 may take the form of other devices, such as game controllers, mobile phones, tablets, laptop computers, desktop computers, and other devices capable of producing control signals that are provided to the vehicle 20.

Figure 4:
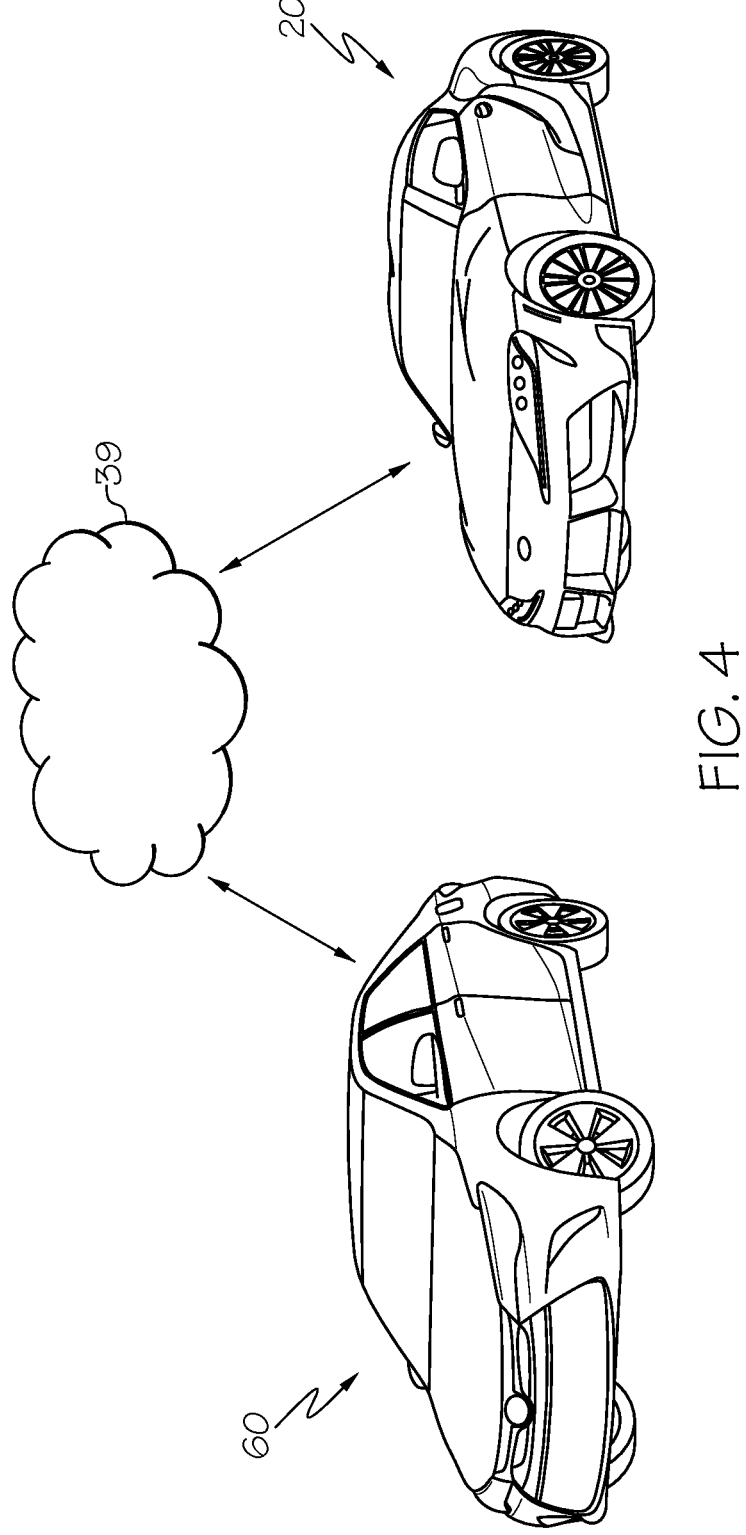
FIG. 4 illustrates a system where a second vehicle is used to control a remote vehicle according to one or more embodiments described and illustrated herein.
Figure 5:
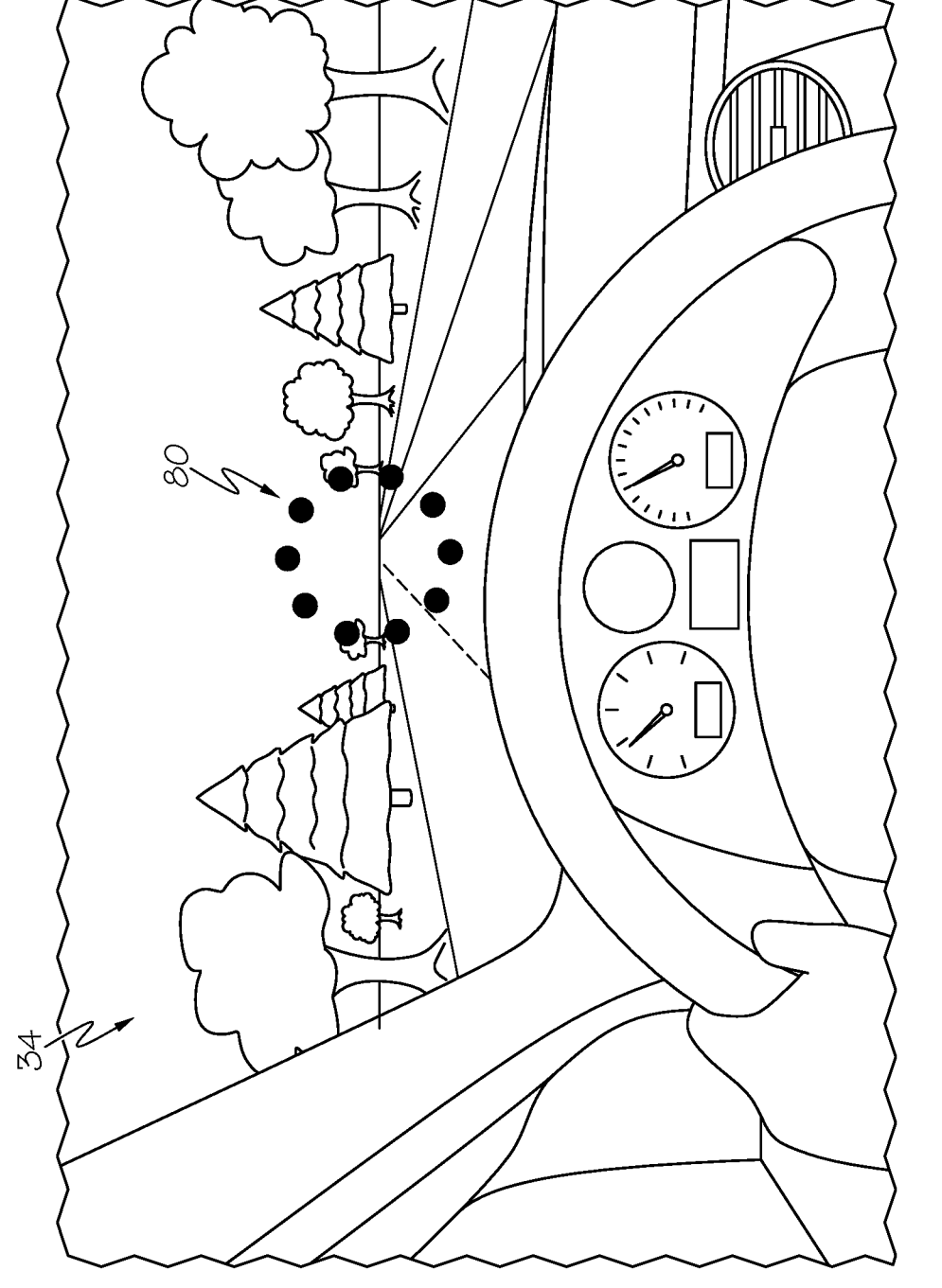
FIG. 5 illustrates a rendered environment displayed on an electronic display according to one or more embodiments described and illustrated herein.

In some embodiments, the control interface 32 is another physical vehicle. Referring to FIG. 4, in this system 100' the control interface takes the form of a second vehicle 50 such that inputs made within the second vehicle 50 creates control signals for controlling the remote vehicle 20. In this embodiment, the driver data communication module 36 takes the form of a portable computing device (e.g., a laptop or a specialty computing device) that is connected to the CAN bus (or other communication bus) of the second vehicle 50. The driver data communication module 36 receives the control signals from the various control devices of the second vehicle 50 (e.g., steering wheel, pedals, and the like). The driver data communication module 36 then wirelessly transmits these control signals to the vehicle data communication module 27 via the wireless communication network 39 for controlling the vehicle 20 as described above.

The electronic display 34 may be provided within the second vehicle 50 and take on a variety of forms. In one example, the electronic display 34 is a virtual reality headset. As another example, the electronic display 34 is a pair of augmented reality glasses. In yet another embodiment, the electronic display 34 is a heads-up display projector that projects the rendered environment on the windshield of the second vehicle 50.

As a non-limiting example, a user may sit in his or her own vehicle (i.e., the second vehicle 50) to control another vehicle at a different location, such as a racecar at a racetrack. During the remote control session, physical motion of the second vehicle 50 is disabled. Pressing the pedals of the second vehicle 50 does not control the motion of the second vehicle 50 but rather controls the motion of the remote vehicle 20. Similarly, movement of the steering wheel of the second vehicle 50 does not control the front wheels of the second vehicle 50 but rather the front wheels of the remote vehicle 20. A view from the driver's seat of the remote vehicle 20 is rendered and displayed within the second vehicle 50. In this manner, a user can user his or her own vehicle to drive a racecar at a racetrack.

In some embodiments, the vehicle data communication module 27 is operable to, based on the vehicle sensor data and/or the environment data, take over control of the vehicle

20 when it predicts that it may hit an obstruction or otherwise be involved in an undesirable outcome. For example, the vehicle data communication module 27, or another ECU within the vehicle, may predict a trajectory of the vehicle 20 based on present data. A risk calculation may be made to determine the risk that the vehicle 20 will be in an undesirable outcome, such as a crash, based on the predicted trajectory of the vehicle 20. In such situations, the vehicle data communication module 27, or some other ECU (e.g., ADAS ECU) will take over control of the vehicle to change the trajectory and avoid the undesirable outcome.

In some embodiments, the driver data communication module 36 produces virtual vehicles or other obstacles that share the road with the remote vehicle 20 as displayed by the electronic display 34. For example, virtual race competitor vehicles may be generated to race around the virtual representation of a racetrack that the user can race against. These virtual race competitor vehicles will not be physically present on the racetrack but the user may interact with these virtual race competitor vehicles by way of the rendered environment displayed by the electronic display 34. Other obstacles may be presented for the user to avoid, such as debris in the road, rockslides, and the like. Thus, the system can be used for training purposes.

Referring to FIG. 6, the rendered environment may include additional features for the user to interact with while controlling the remote vehicle 20. FIG. 6 illustrates a gateway 80 that the user is to driver through. For example, the rendered environment may be configured to gamify the control of the physical vehicle 20 so that the user can earn points while controlling the physical vehicle 20. As another example, the electronic display 34 may display a line that the user is to closely follow. Following the line as shown on the electronic display 34 causes the physical vehicle to follow a similar path in the actual environment. A user may be scored based on how closely he or she follows the line. The line may also be used for training purposes, such for teaching a user how to make banked turns on a racetrack.

As another example, multiple remote vehicles 20 may be remotely controlled by multiple users. For example, other vehicles 29A, 29B may be remotely controlled via different driver stations such that the remote vehicle 20 and other vehicles 29A, 29B race against each other by different individuals that are remote from the racetrack.

As stated above, embodiments are not limited to racing vehicles. For example, the remote vehicle may be an off-road vehicle that is operating in a remote environment. For example, the remote environment may be a mountainous environment for which the off-road vehicle must traverse over large rocks and boulders. Sensor data from the off-road vehicle, as well as any environment sensors (e.g., portable sensors such as temperature sensors, ambient light sensors, and the like) may be transmitted by way of a satellite communications system to a driver station as describe above. The user may then traverse the difficult terrain using the driver station. Because off-road vehicles do not typically drive very fast, such as a racecar, data latency may be less of an issue when remotely operating the off-road vehicle.

It should now be understood that embodiments of the present disclosure are directed to systems and methods for remote control of vehicles. The systems and methods provide a driver station that a user may use to remotely control a vehicle over a high-speed wireless communication network, such as a 5G mmWave wireless communication network. A wireless communication network having data speeds equal to or greater than a 5G mmWave wireless communication network enables the remote control of high-speed vehicles, such as racecars. The driver station may be located proximate the remote vehicle, or located in other parts of a country or world. The driver station may be a driver simulation device, a virtual reality headset, augmented reality glasses, or another full-size vehicle. Vehicle sensor data and environment sensor data is transmitted to the driver station over the wireless communication network. This sensor data is used to render a realistic virtual environment of the environment in which the physical vehicle is traveling. Driver control signals and instructions are transmitted from the driver station to the vehicle over the wireless communication network to remotely control the vehicle. In this manner, users may remotely driver a vehicle, such as a racecar on a racetrack or an off-road vehicle in a remote environment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system comprising:
a driver station comprising a control interface, an electronic display, and a driver data communication module; and
a vehicle data communication module, wherein:
the driver station is remote from the vehicle data communication module;
the vehicle data communication module receives vehicle sensor data generated by a plurality of vehicle sensors of a vehicle, and environment sensor data generated by a plurality of environment sensors within an environment of the vehicle; and
the driver data communication module and the vehicle data communication module are in bidirectional communication such that:
the vehicle data communication module wirelessly provides the vehicle sensor data and the environment sensor data to the driver data communication module;
the driver data communications module predicts a trajectory of the vehicle based on the vehicle sensor data and the environment sensor data;
the driver data communication module renders a view of the vehicle and the environment on the electronic display based on the trajectory, the vehicle sensor data, and the environment sensor data;
the control interface wirelessly provides control instructions to the vehicle data communication module; and
the vehicle data communication module provides the control instructions to the vehicle such that a user of the control interface remotely operates the vehicle.

2. The system of claim 1, wherein the vehicle data communication module and the driver data communication module communicate over a 5G mmWave network.

3. The system of claim 1, wherein the plurality of environment sensors comprise one or more of a temperature sensor, a humidity sensor, an ambient light sensor, a wind speed sensor, and a wind direction sensor.

4. The system of claim 3, wherein the environment is a racetrack and the vehicle is present on the racetrack.

5. The system of claim 1, wherein the plurality of vehicle sensors comprises one or more of a speedometer, a inertia measurement unit, an accelerator sensor, a braking sensor, a camera, a radar sensor, a lidar sensor, a tire pressure sensor, and a steering sensor.

6. The system of claim 1, wherein the control interface comprises a driving simulator device comprising a seat, a steering wheel, one or more pedals, a shifting device, a turn signal device, and the electronic display.

7. The system of claim 6, wherein the driving simulator device comprises one or more actuators to move the seat according to an orientation of the vehicle.

8. The system of claim 1, wherein the control interface comprises a second vehicle such that second vehicle control instructions generated by the second vehicle are provided to the vehicle data communication module and a user controls the vehicle by controlling the second vehicle.

9. The system of claim 1, wherein the vehicle data communication module is operable to override the control instructions from the driver data communication module.

10. The system of claim 1, wherein the predicted trajectory accounts for data latency when the vehicle sensor data and the environment sensor data is wirelessly transmitted from the vehicle data communication module to the driver data communication module.

11. A system comprising:
a driver station comprising a control interface, an electronic display, and a driver data communication module; and
a racing vehicle comprising a plurality of vehicle sensors;
a vehicle data communication module provided at a racetrack, wherein:
the driver station is remote from the vehicle data communication module;
the vehicle data communication module receives vehicle sensor data generated by the plurality of vehicle sensors, and environment sensor data generated by a plurality of environment sensors at the racetrack; and
the driver data communication module and the vehicle data communication module are in bidirectional communication such that:
the vehicle data communication module wirelessly provides the vehicle sensor data and the environment sensor data to the driver data communication module;
the driver data communications module predicts a trajectory of the vehicle based on the vehicle sensor data and the environment sensor data;
the driver data communication module renders a view of racing the vehicle and the environment on the electronic display based on the trajectory, the vehicle sensor data, and the environment sensor data;
the control interface wirelessly provides control instructions to the vehicle data communication module; and the vehicle data communication module provides the control instructions to the racing vehicle such that a user of the control interface remotely operates the racing vehicle.

12. The system of claim 11, wherein the vehicle data communication module and the driver data communication module communicate over a 5G mmWave network.

13. The system of claim 11, wherein the plurality of environment sensors comprise one or more of a temperature sensor, a humidity sensor, an ambient light sensor, and a wind sensor.

14. The system of claim 11, wherein the plurality of vehicle sensors comprises one or more of a speedometer, a inertia measurement unit, an accelerator sensor, a braking sensor, a camera, a radar sensor, a lidar sensor, a tire pressure sensor, and a steering sensor.

15. The system of claim 11, wherein the control interface comprises a driving simulator device comprising a seat, a steering wheel, one or more pedals, a shifting device, a turn signal device, and the electronic display.

16. The system of claim 15, wherein the driving simulator device comprises one or more actuators to move the seat according to an orientation of the vehicle.

17. The system of claim 11, wherein the control interface comprises a second vehicle such that second vehicle control signals generated by the second vehicle are provided to the vehicle data communication module and a user controls the racing vehicle by controlling the second vehicle.

18. The system of claim 11, wherein the vehicle data communication module is operable to override the control instructions from the driver data communication module.

19. The system of claim 11, further comprising one or more additional racing vehicles and one or more additional driver stations, wherein the one or more additional racing vehicles are communicatively coupled to the vehicle data communication module and the one or more additional driver stations are communicatively coupled to the driver data communication module or one or more additional driver communication modules.

20. The system of claim 11, wherein the predicted trajectory accounts for data latency when the vehicle sensor data and the environment sensor data is wirelessly transmitted from the vehicle data communication module to the driver data communication module.

* * * * *